United States Patent [19]
Takiyasu et al.

[11] Patent Number: 5,862,142
[45] Date of Patent: Jan. 19, 1999

[54] FREQUENCY HOPPING WIRELESS COMMUNICATION SYSTEM AND COMMUNICATION EQUIPMENT

[75] Inventors: Yoshihiro Takiyasu, Kodaira; Eiichi Amada; Tomoaki Ishifuji, both of Tokyo; Genichi Ishii, Hachioji; Hidehiko Jusa; Shuichi Adachi, both of Hadano, all of Japan

[73] Assignee: Hitachi, Ltd., Toko, Japan

[21] Appl. No.: 461,527

[22] Filed: Jun. 5, 1995

[30] Foreign Application Priority Data

Jun. 22, 1994 [JP] Japan ................................. 6-139856

[51] Int. Cl.[6] ........................................................ H04J 1/00
[52] U.S. Cl. ............................................ 370/480; 370/350
[58] Field of Search ........................... 370/69.1, 18, 29, 370/77, 60.1, 50, 95.1, 95.2, 95.3, 109, 118, 85.1, 85.9, 85.11, 85.8, 85.7, 94.3, 85.13, 60, 94.1, 94.2, 310, 320, 342, 341, 335, 329, 344, 324, 350, 503, 430, 431, 464, 480, 509, 512, 347, 442; 340/825.05, 825.01, 825.02; 375/200, 202, 203, 204, 205; 455/33.1, 33.2, 38.1, 53.1, 428, 524, 517, 512

[56] References Cited

U.S. PATENT DOCUMENTS

| | | | |
|---|---|---|---|
| 5,123,029 | 6/1992 | Bantz et al. | 375/202 |
| 5,260,967 | 11/1993 | Schilling | 375/203 |
| 5,299,227 | 3/1994 | Rose | 375/200 |
| 5,414,731 | 5/1995 | Antunes et al. | 375/202 |
| 5,418,812 | 5/1995 | Reyes et al. | 375/200 |

Primary Examiner—Dang Ton
Attorney, Agent, or Firm—Antonelli, Terry, Stout & Kraus, LLP

[57] ABSTRACT

In a wireless communication system having a plurality of base stations connected through a control line and a plurality of mobile terminals, one of base stations (a master base station) informs a carrier frequency hop timing to the other base stations (slave base stations) through the control line. Each slave base station generates a wireless communication frame used inside of each cell and switches the carrier frequency of the wireless communication frame in synchronous to the timing indicated by the master base station. Each movable terminal receives an identifier of a frequency hopping sequence from a control information field of the wireless communication frame, hops to one carrier frequency selected among a frequency hopping sequence corresponding to this identifier, and transmit or receive the data through the field following the control information field of the wireless communication frame.

15 Claims, 12 Drawing Sheets

| FRAME # \ BASE STATION # | 1 | 2 | 3 | 4 | 5 | |
|---|---|---|---|---|---|---|
| i | 1 | 3 | 5 | 7 | 9 | ~ 16a |
| i+1 | 2 | 4 | 6 | 8 | 10 | |
| i+2 | 3 | 5 | 7 | 9 | 11 | |
| i+3 | 4 | 6 | 8 | 10 | 1 | |
| i+4 | 5 | 7 | 9 | 11 | 2 | |
| i+5 | 6 | 8 | 10 | 1 | 3 | |
| i+6 | 7 | 9 | 11 | 2 | 4 | |
| i+7 | 8 | 10 | 1 | 3 | 5 | |
| i+8 | 9 | 11 | 2 | 4 | 6 | |
| i+9 | 10 | 1 | 3 | 5 | 7 | |
| ⋮ | ⋮ | ⋮ | ⋮ | ⋮ | ⋮ | |
| i+11 | 1 | 3 | 5 | 7 | 9 | ~ 16k |
| ⋮ | ⋮ | ⋮ | ⋮ | ⋮ | ⋮ | |

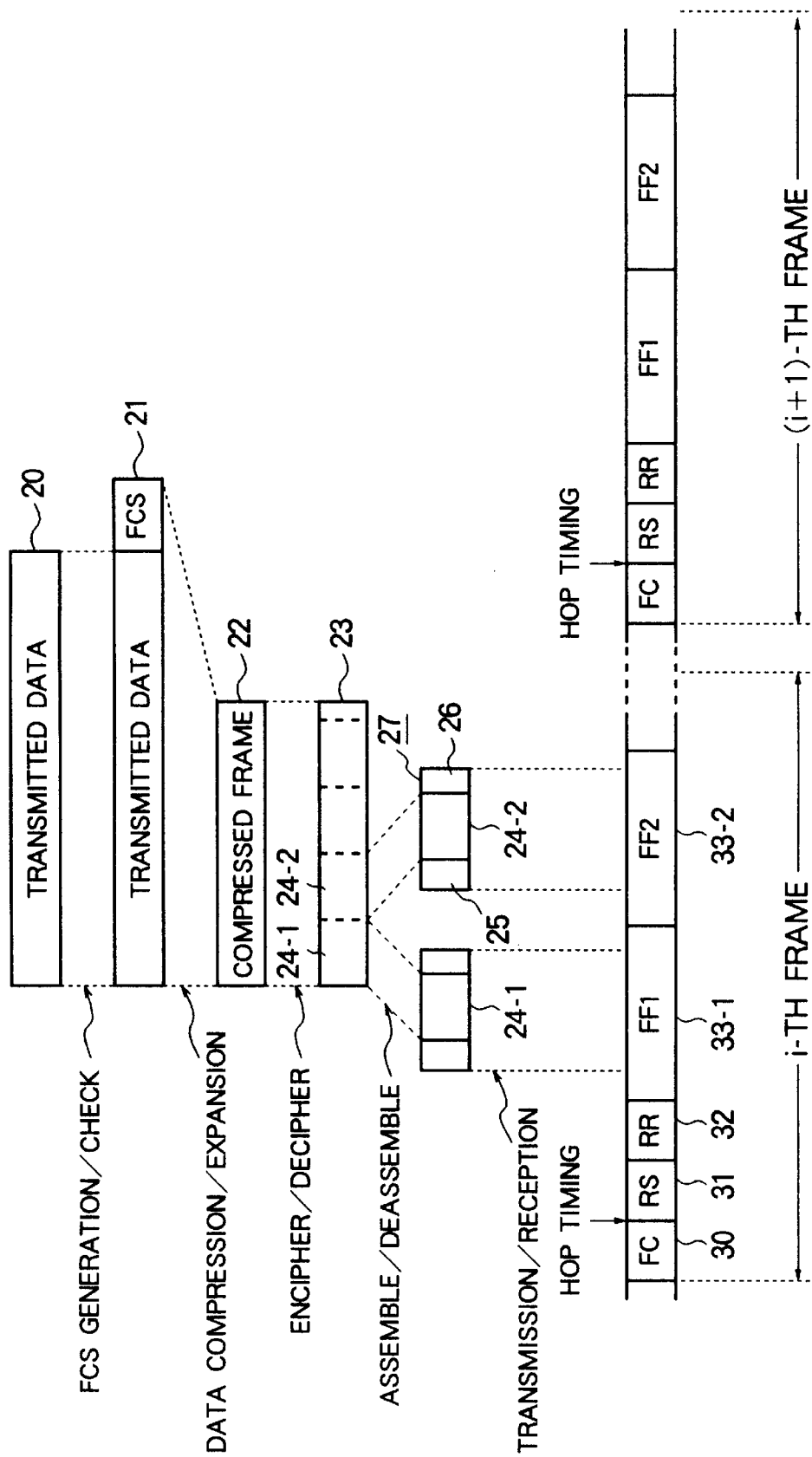

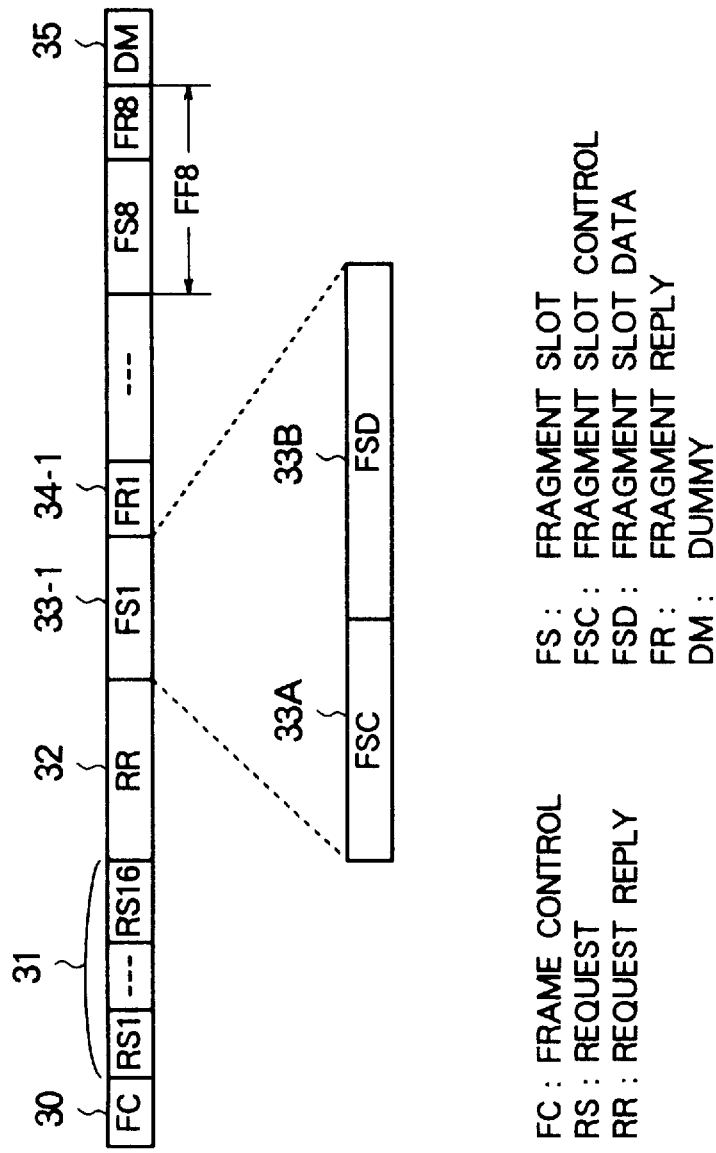

FIG.7

| FGAT PATTERN | TYPE (ATTRIBUTE) OF FRAGMENT |
|---|---|
| 0000 0001 | FRAGMENT SLOT FOR NEW INDIVIDUAL COMMUNICATION DATA |
| 0000 0011 | FRAGMENT SLOT FOR NEW BROADCAST/MULTICAST COMMUNICATION DATA |
| 0000 0000 | FRAGMENT SLOT FOR SYNCHRONOUS TRANSMISSION DATA |
| 0001 0001 | FRAGMENT SLOT FOR RETRANSMITTED INDIVIDUAL COMMUNICATION DATA FROM BASE STATION |
| 0001 0011 | FRAGMENT SLOT FOR RETRANSMITTED BROADCAST/MULTICAST COMMUNICATION DATA FROM BASE STATION |
| 0010 0001 | FRAGMENT SLOT FOR RETRANSMITTED INDIVIDUAL COMMUNICATION DATA FROM SOURCE TERMINAL |
| 0010 0011 | FRAGMENT SLOT FOR RETRANSMITTED BROADCAST/MULTICAST COMMUNICATION DATA FROM SOURCE TERMINAL |
| 0100 0000 | FRAGMENT SLOT FOR CALL CODE DATA OF BASE STATION |
| 0100 0100 | FRAGMENT SLOT FOR CALL CODE DATA OF WIRELESS TERMINAL |
| 1000 0000 | FRAGMENT SLOT NOT ASSIGNED |

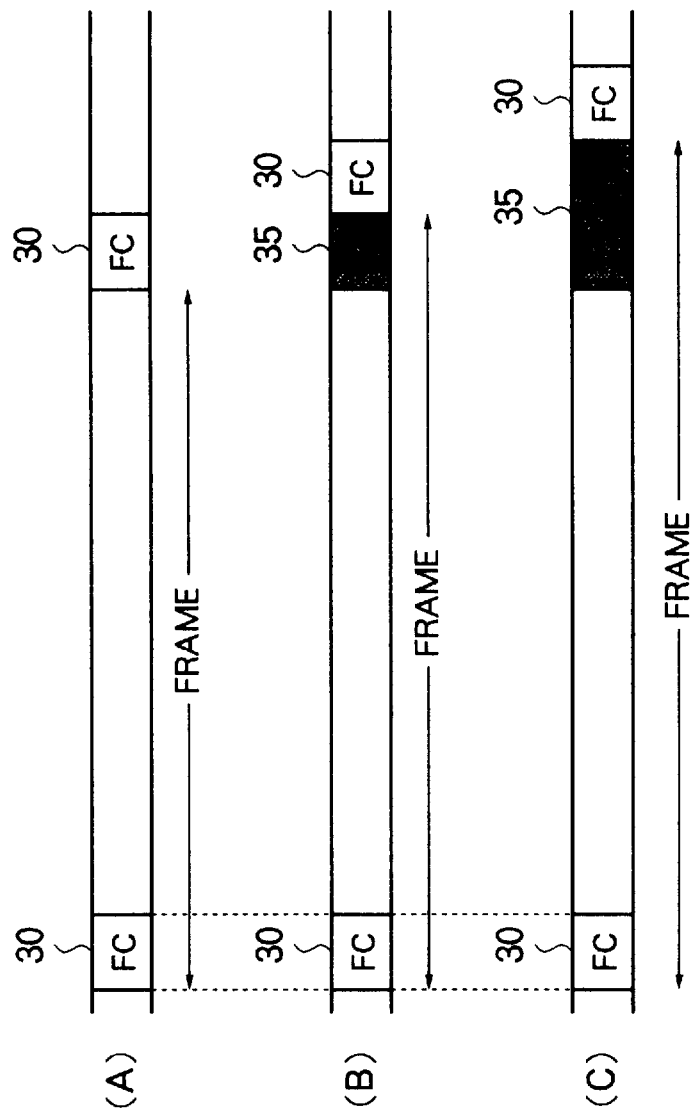

FREQUENCY HOPPING WIRELESS COMMUNICATION SYSTEM AND COMMUNICATION EQUIPMENT

CROSS-REFERENCE TO RELATED APPLICATION

The present application relates to U.S. patent application Ser. No. 08/203373 filed on Mar. 1, 1994, and assigned to the present assignee. The disclosure of that application is incorporated herein by reference.

BACKGROUND OF THE INVENTION

1. Field of the Invention

The present invention relates to a wireless communication system and communication equipment, and more particularly to the frequency hopping wireless communication system which is arranged so that a base station can manage communication control timings and transmission rights for plural communication equipments and the wireless communication equipment which applies to the system.

2. Description of the Related Art

There has been conventionally proposed a wireless communication system which is arranged to communicate data between wireless terminals through the application of "a frequency hopping spread spectrum" for changing a carrier frequency for each cell formed by a base station, based on a predetermined same hopping sequence and hopping period. As such a wireless system, a system for hopping a carrier frequency at each wireless communication frame (called as a prior art 1) has been known in IEEE 802.11 Working Document, IEEE P802.11/92-39, "Medium Access Control Protocol for Wireless LANS" (Publication 1), for example.

The prior art discussed in the publication 1 describes that a wireless communication frame (simply called as a communication frame) is composed of a first field used by the base station for broadcasting data for all the communication equipments (mobile wireless terminals) included in the cell, a second field used by a wireless terminal inside of the cell for sending data for the base station though the data may conflict with another piece of data sent by another wireless terminal inside of the cell, and a third field used by a wireless terminal inside of the cell for sending data according to an indication given by the base station. The length of each field is adjustable to each kind of system. The information indicating the length of the field is placed in the first field of each frame.

The base station transmits control information indicating a carrier frequency of the next wireless communication frame by the first field of the current communication frame, so that each wireless terminal inside of the cell hops the carrier frequency at each frame. The publication 1 suggests that a carrier frequency possibly conflicts with another carrier in an overlapped portion between the adjacent cells if any.

On the other hand, as one system for accessing a wireless channel, there has been conventionally known "split-channel reservation multiple access method". In this method, a wireless communication frame is divided into a control information transfer field and a data transfer field. The control information transfer field is divided into a transmission request field composed of plural slots and a reply field for each transmission request field. Each wireless terminal requests a data transmission right of the base station through the transmission request slot and the base station gives back the reply (transmission right) to the request through the reply field.

The concrete arrangement of the foregoing split-channel reservation multiple access method is discussed in "Access Control Method for Wireless LAN" in IEICE (Institute of Electronics, Information and Communication Engineers) Technical Report, RCS 92-37 (Publication 2) or the foregoing publication 1.

As indicated in the publications 1 and 2, a wireless terminal trying to transmit data inside of the cell to which the terminal itself belongs or another wireless terminal trying to register for the cell to which the terminal does not belong uses any slot defined in the control information field of each communication frame for issuing a transmission request or a registration request to the base station through the effect of the Slotted ALOHA method (called as the conventional system 2).

Further, encipherment of data to be transmitted on a wireless channel and obtention of security of data by compressing the transmission data (called as the conventional system 3) has been known in Nikkei Communications No.148, 1993, 30 to 31 (Publication 3).

In the frequency hopping spread spectrum system described in the publication 1, if the adjacent cells partially overlap with, the received data may become erroneous, because a probability exists that the carrier frequencies may conflict with each other in the overlapped portion. The error rate of the received data is presumed to be about 0.5.

In this case, the use of an error correcting mechanism disallows correct data communication. Hence, the communication efficiency is made lower by a conflict time against the overall communication time.

The probability that the foregoing conflict of the carrier frequencies takes place in each cell is, in general, made higher in proportion to the number of adjacent cells and in inverse proportion to the number of hops of a carrier frequency in a hopping period. For example, the use of a Read-Solomon sequence as the hopping sequence, in any two sequence, allows the carrier frequencies to conflict with each other once at one period at maximum. Hence, if interference takes place among n cells, each cell of which uses n frequency hops, the carrier frequencies may theoretically conflict with each other in all the time zones.

Further, if as described in the prior art 1 the system for reporting a next carrier frequency to be hopped in each wireless communication frame brings about a transmission error, thereby disabling to receive the carrier frequency information, disadvantageously, each wireless terminal disables to correctly receive the subsequent communication frames unless the communication frame is re-synchronized.

On the other hand, in the prior art 2 arranged to use the Slotted ALOHA method for the control information field of each wireless communication frame, each wireless terminal enables to transmit data having any content to any slot. Hence, no restriction is placed on the number of the wireless terminals to be located in each cell. It means that only that slot is used for the obtention of the transmission right and the request of registration for the cell. The use of the Slotted ALOHA method, however, involves the following inevitable disadvantage: That is, the increase of the wireless terminals for transmitting data to a slot (enhancement of a utilization rate of the control information field) leads to the increase of the re-transmissions resulting from contention of transmissions from plural wireless terminals on the same slot, thereby lowering a throughput.

Further, compression of the transmission data is realized by converting the transmission data train into another data train having a small amount of information according to the predetermined conversion rules. As the conversion rules for data compression, the public rules are applied. Hence, only the application of the prior art 3 disallows data transfer efficiency to be improved and positive security of transmission data to be obtained.

SUMMARY OF THE INVENTION

It is an object of the present invention to provide a wireless communication system and communication terminal equipment which do not lower their communication efficiency if the adjacent cells are partially overlapped with each other.

It is a further object of the present invention to provide a wireless communication system and communication terminal equipment which are arranged to properly hop a carrier frequency if a transmission error takes place.

It is a yet further object of the present invention to provide a wireless communication system and communication terminal equipment which are arranged to keep their throughputs as high as possible if load is increased (the wireless terminals are increased in number) in each cell.

It is another object of the present invention to provide a wireless communication system and communication terminal equipment which are superior in data security and data transfer efficiency.

In carrying out the foregoing objects, the wireless communication system according to the present invention includes plural base stations for forming the corresponding cells so that these base stations synchronously hop their carrier frequencies for operating communication equipments (mobile wireless terminals) located in these cells. In order for plural base stations to synchronously hop their carrier frequencies, the wireless communication system according to the present invention operates to transmit control information indicating a frequency hop timing from one of the base stations, that is, a master base station to the other base stations (slave base stations) and causes each slave base station to hop a carrier frequency of a wireless communication frame inside of the cell on the predetermined timing determined on the above control information.

To communicate the control information between the master base station and the slave base station(s), it is possible to use a back-bone network composed of wired paths such as FDDI or Ethernet for connecting the base stations, a wired path leased to the control communication between the base stations, or a wireless communication path of a different band from a radio band inside of the cell.

The prior art is arranged so that each base station transmits control information indicating a next carrier frequency to be hopped to the wireless terminal inside of the corresponding cell by means of the communication frame, while for reducing the adverse effect brought about by a transmission error, the system according to the present invention is arranged so that each base station notifies a wireless terminal inside of the corresponding cell of a hopping identifier defined between the base station and each wireless terminal. Each wireless terminal provides table means for pre-storing plural hopping sequences corresponding to plural hopping sequence identifiers, those sequences composed of a group of carrier frequencies to be respectively hopped in a predetermined sequence. If the base station specifies a hopping sequence identifier, the wireless terminal operates to find out the next carrier frequency to be hopped by referring to the table means and hop a frequency for transmission or receive on a predetermined timing.

According to a preferred embodiment of the invention, the control information of the wireless communication frame generated by each base station is composed of plural slots for requesting registration (first group of request slots) and plural slots for requesting transmission (second group of request slots). Each slot of the first request slot group is arbitrarily used in, say, the Slotted ALOHA manner by a wireless terminal transferred to the corresponding cell. About the second request slot group, each slot is specified for the corresponding wireless terminal by the base station.

In a case that the wireless terminals held in the cell are increased in number, the slots are short in one communication frame to assign the slots for requesting transmission to all the wireless terminals in the cell, the "multi-control-information method" is adopted. That is, the base station operates to assign one slot of the second request slot group to the wireless terminals respective to the frames and allows the same slot to be used by these wireless terminals in a time-divisional manner.

Further, the system according to the present invention operates to solve the problem about the security of transmitted data by performing a process for data compression such as V.42 bis and an encipherment process with respect to the user data. If the encipherment process is done before, the user data is randomized as a bit train and thereby a data compression ratio is made lower. Hence, after the process for data compression is done, the data is enciphered for improving data transfer efficiency.

The wireless communication system according to the present invention is arranged so that plural slave base stations hop their carrier frequencies in synchronous to the master base station. If the number of cells does not exceed the number of hops, the probability of conflicting the carrier frequencies with each other is made zero. Hence, if the base station is located in a manner of repetitively overlapping the adjacent cells with each other, the communication efficiency is not degraded.

Further, according to the present invention, each base station operates to transmit a hopping sequence identifier as hopping control information at each wireless communication frame, while each wireless terminal inside of the cell operates to refer to the table based on the received hopping sequence identifier received from the base station, grasp a combination of a carrier frequency and a hopping sequence to be used, and hop to the next carrier frequency. Hence, for example, if the transmission error brings about the disabled reception of the hopping control information over several frames, each wireless terminal and the base station enable to hop to the same carrier frequency in the same sequence through the effect of their timers.

Moreover, the base station and each wireless terminal operate on their own reference clocks whose matching accuracy is several tens ppm, for example. If, therefore, the length of the wireless communication frame is about 25K bytes, the reference clock slip between the base station and each wireless terminal is 10 ppm, the signal slip therebetween is about one bit for a time length of as long as four frames.

Hence, in a case that the timing on which the carrier frequency is hopped allows for a time length of some bits in each communication frame, if no hopping control information is received for several frames, each wireless terminal operates to determine a hop timing on its own clock in the wireless communication frame having a known structure and thereby hop to the next carrier frequency without having to keep the base station out of the synchronization.

BRIEF DESCRIPTION OF THE DRAWINGS

FIG. 5 is a view showing a relation between transmitted data and a fragment transmitted through each wireless communication frame;

FIG. 6 is a view showing one example of a format of the wireless communication frame;

FIG. 7 is a graph showing correspondence between fragment types and FGAT patterns;

FIG. 8 is a view showing wireless communication frames having respective dummy field sizes to be used for cells in the system according to another embodiment of the present invention;

DESCRIPTION OF THE PREFERRED EMBODIMENTS

Figure 1:
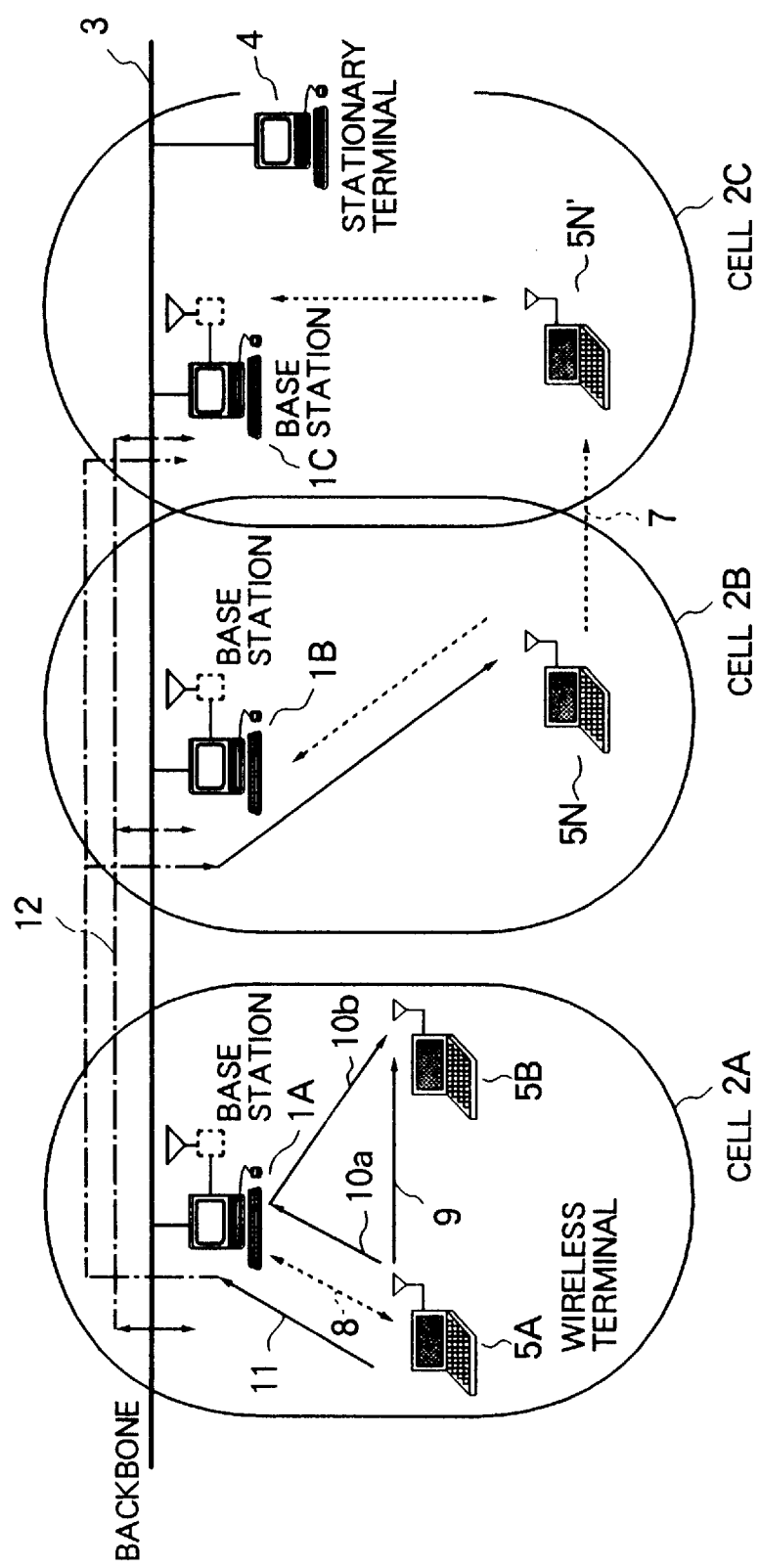
FIG. 1 is a view showing a wireless communication system according to an embodiment of the present invention.

FIG. 1 shows an overall arrangement of a wireless communication system to which the present invention applies.

The wireless communication system includes plural base stations 1 (1A, 1B, 1C, . . . ) connected through a wired path (backbone) 3 and plural communication equipments (wireless terminals) 5 (2A, 2B, 2N, . . . ) to be moved in an area (cell) 2 (2A, 2B, 2C, . . . ) for which each base station is responsible.

The base station 1 provides various kinds of databases. The base station 1 operates to control an access to a wireless link of each wireless terminal located in the responsible cell or relay transmission data to the terminal by using the information stored in those databases. The communication between mobile wireless terminals 5A and 5N located in respective cells or between the mobile wireless terminal 5A and a stationary terminal 3 fixed to a path 3 is implemented through the base station and the backbone 3.

A numeral 8 denotes a communication path of a wireless channel used for a request for transmission (transmission right), a request for registering for the cell (request for registering an identifier of a wireless terminal for a filtering database), both of which are given from the wireless terminal to the base station, or a response given from the base station. A numeral 9 denotes a communication path of a wireless channel used for transferring data between the wireless terminals located in one cell.

The communication between the wireless terminals located in one cell may be implemented through a communication path including the base station as indicated by numerals 10a and 10b. A numeral 11 denotes a communication path used for transferring data between cells or a cell and an existing stationary terminal connected to the backbone. A numeral 12 denotes a transfer path for a control frame between the base stations.

In the foregoing wireless communication system, an auto-hand-off function provided in the base station allows each wireless terminal to be freely moved between the cells as indicated by an arrow 7, for example.

The auto-hand-off function is roughly divided into;

(1) a process for requesting to register for a cell, which a wireless terminal executes against a base station for taking responsibility of a new cell when the terminal moves in the cell, (2) a process for registering an address of the wireless terminal (identifier of the wireless terminal) moved into the cell for a filtering database, the process being executed by the base station taking responsibility for the cell in response to the request for subscription, and (3) a process for cancelling an address of the wireless terminal moved out of a filtering database, the process being executed by the previous base station.

Each base station operates to determine whether or not a destination communication station (terminal) is located in its own cell (for which the base station is responsible) by comparing a destination address of the station received through a wireless frame with data registered in the filtering database included in the base station. If no destination communication station exists in the cell, the base station operates to relay the received data to the backbone.

According to the present invention, the inter-base-station control frame communicated through a communication path 12 located on the backbone is divided into two types;

(1) notice of cancelling an entry in the filtering database in accordance with the auto-hand-off function, and (2) notice of inter-base-station synchronization to be discussed later.

Both types of control frames use a frame format according to the MAC protocol on the backbone 3, that is, a frame format whose MAC address assigned to each base station is a destination address.

Figure 2:
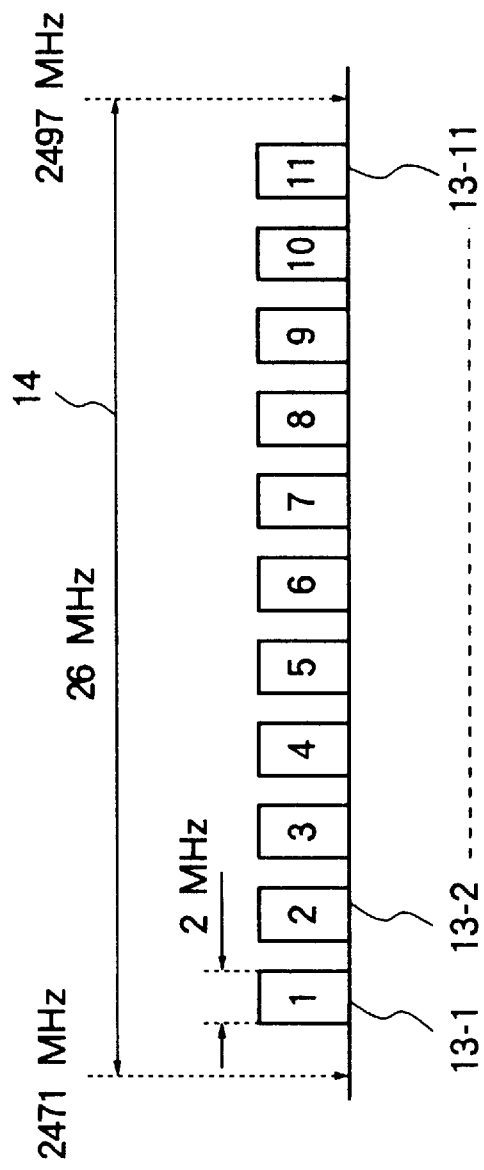
FIG. 2 is a view showing assignment of a carrier frequency used in the wireless communication system.

FIG. 2 shows how a carrier frequency used for a wireless channel is assigned in the wireless communication system according to the present invention.

The wireless channel uses an ISM band 14 having a width of 26 MHz assigned to a spread spectrum system. This ISM band is divided into eleven subchannels 13-1 to 13-11 each having a band width of 2 MHz. Each base station operates to hop a carrier frequency among these eleven subchannels at a frame time period (low speed) according to a predetermined hopping pattern.

Figures 3, 4:
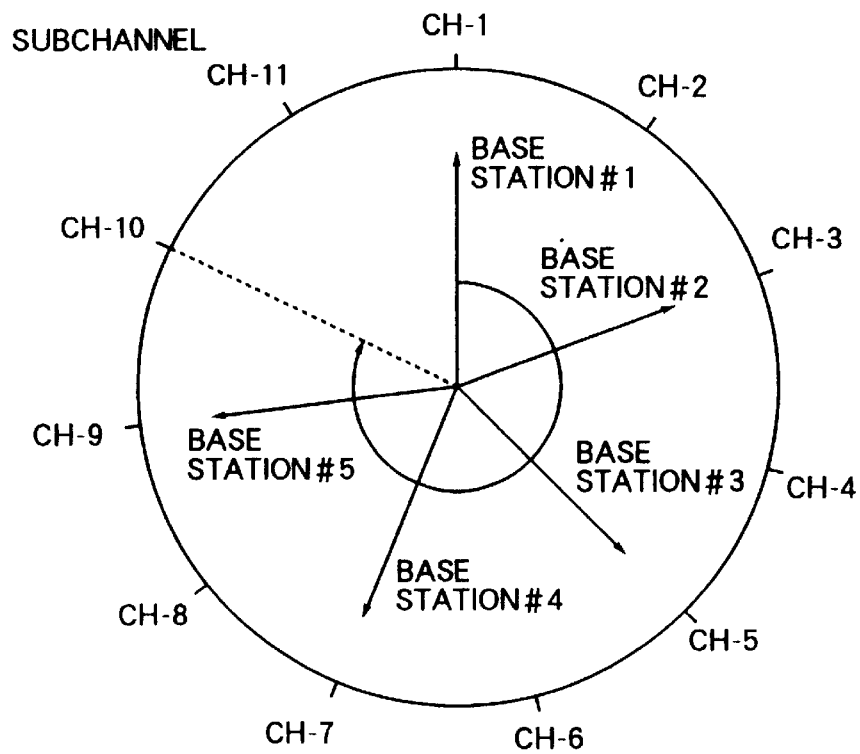
FIG. 3 is an explanatory view showing how a carrier frequency is hopped in each base station.
FIG. 4 is a graph showing a relation between a wireless communication frame and a carrier frequency of each base station.

FIG. 3 shows a summary of a hopping pattern of carrier frequencies (subchannels) executed by plural base stations in synchronization. FIG. 4 shows how the carrier frequencies change at each frame in each base station.

Herein, five base stations (base stations #1 to #5) are connected with each other through the backbone 3. The base station #5 is assumed to be a master base station. This master base station operates to transmit an inter-base-station control frame to the backbone 3, while in response to the control frame, the other four base stations #1 to #4, that is, the slave base stations, operate to hop the carrier frequencies synchronously by to the master base station.

FIG. 3 shows the state in which the base station #5 uses a subchannel 9 and the other base stations #4, #3, #2 and #1 use the corresponding subchannels "7", "5", "3" and "1".

The location of the subchannels, in such a manner as determined above, results in separating the carrier frequency of one cell from the frequency of the adjacent cell by 2 MHz or more. Hence, the carrier frequency used for one cell is allowed to be completely separated from the other carrier frequency used for the adjacent cell. This prevents interference between the cells.

Each base station operates to switch the subchannel on a predetermined hop timing as selecting the next subchannel clockwise (hopping a carrier frequency).

The subchannels may be concurrently switched by plural base stations in synchronism with an instruction issued by the master base station. In place, these subchannels may be switched to the next ones by the responsible base stations on the respective timings slipped a bit of time from each other, in order that the switching of all the frequencies by all the base stations is completed within one frame period. This makes it possible to switch a carrier frequency of each base station at each frame unit as indicated by numerals 16a to 16k of FIG. 4.

The master base station #5 individually communicates the inter-base-station control frame with each of the slave base stations for controlling the synchronization of frequency hopping. In this operation, if the backbone keeps its utilization rate high, the synchronization control frame does not arrive at the slave base stations at the same time. These variable arrival times may temporarily bring about a period when two cells use the adjacent subchannels to each other for the operation.

In order to overcome this phenomenon, for example, the master base station #5 may operate to broadcast a synchronous control command to the slave base stations by using the control frame for group broadcast. This operation cannot absorb any dispersion resulting from the waiting times caused in the receive frame buffer on the backbone side of each slave base station.

In this case, for example, the system may be controlled as follows: The slave base station #4 hops the carrier frequency from the subchannel "7" to "8" later by ¼ frame than when the master base station #5 hops to the subchannel "10". More ¼ frame later, the slave base station #3 hops the carrier frequency from the subchannel "5" to "6". This control implements switching of the subchannel as constantly keeping the carrier frequency of a cell separated by 2 MHz from the carrier frequency of the adjacent cell if the dispersion of the hopping time in each cell is ¼ frame time or less.

FIG. 5 shows a relation between the data each wireless terminal 5 tries to transmit to the target terminal and the transmitted data in each wireless frame.

In response to the transmitted data 20 given from the wireless terminal, an FCS for detecting an error occurring in transmission is generated so that the FCS is added to a transmitted data frame 21.

According to the present invention, the data compression according to the V.42 bis of ITU TS is carried out with respect to the transmitted data frame 21. As a result, the transmitted data frame 21 is converted into a data-length compressed frame 22. The frame 22 is enciphered for forming an enciphered data frame 23.

The enciphered data frame 23 is divided into plural data blocks 24 (24-1, 24-2, . . . ) with a fixed length (say, 250 bytes). Then, a header 25 and a trailer 26 are added to each data block (herein, called as fragment information) for forming a fragment data 27. These fragment data 27 are modulated by the foregoing carrier frequencies of the base stations. Then, the modulated data is sent in the air on each timing of the fragment field 33 (33-1, 33-2, . . . ) of the wireless communication frame generated by each base station.

Each base station and any one of the wireless terminals located in the same cell operates to process fragment data received on the fragment field of each wireless communication frame in a reverse sequence (assembling, encipherment, extension, and FCS check) to the foregoing transmitting process for reproducing the transmitted data 20.

FIG. 6 shows a communication frame format on a wireless channel. The communication frame indicated herein is periodically generated by each base station 1. Each wireless terminal 5 inside of the cell operates to transmit or receive the data according to the format of the communication frame.

A numeral 30 denotes a frame control field (FC), which is composed of a preamble with a 12-octet length, a frame flag with a 4-octet length, and a control information section with a 6-octet length, all transmitted by the base station.

Each wireless terminal 5 operates to establish a bit synchronization while the preamble is being received and establish a frame synchronisation or an octet synchronization by receiving a frame flag.

The preamble is set to have a pattern of "10101010 10101010 . . . 10101010". The frame flag is set to have a pattern of "11001100 11001100 . . . 11001100", for example.

The control information section includes a base station identifier (BSI) with a 2-octet length, a frame information identifier (FII) with a one-octet length, a multiframe identifier (MFI) with a one-octet length, a dummy field length (DLG) with a one-octet length, and a CRC with a one-octet length.

As the base station identifier (BSI) is set an identifier of the base station for generating the communication frame. As the frame information identifier (FII) are set a 5-bit frequency hopping sequence identifier (HPI) and a 3-bit registration request field number (RSN). As the multiframe identifier (MFI) is set a multiframe identifier. If it does not have a multiframe structure, all the bits are set as "0".

As the dummy field length (DLG) is set a length of a dummy field indicated in octets. In addition, the communication system for establishing an inter-base-station synchronization is required to set the same DLG to each communication frame inside of the system.

A numeral 31 denotes a request field used for transmitting request information such as a request for location registering for a cell or a request for reservation of a transmission right, given from each wireless terminal to the base station.

The request field 31 is composed of 16 slots (RS1 to RS16). Each request slot RSj (j=1 to 16) contains a preamble with a 12-octet length, a field flag with a 4-octet length, and a request information with a 8-octet length. The field flag is set to have a pattern of "11001101 11001101 . . . 11001101", for example.

Sixteen slots contained in the request field 31 is divided into a group of registration request slots and a group of transmission request slots. For example, i slots from RS1 to RSi are used by a wireless terminal newly moved in a cell, for the purpose of transmitting a location registration request (registration request information). 16-i slots from RSi+1 to RS16 are used by a wireless terminal trying to obtain a transmission right, for transmitting a transmission request information.

The transmission right (or access right) of each slot contained in the group of transmission request slots is pre-assigned to a specific wireless terminal when the base station responds to the request for location registering for the cell. Further, a value of i indicates a border between the group of registration request slots and the group of transmission request slots. The value of i is specified by the number of registration request fields (RSN) inside of the frame control field (FC) 30.

As each registration request slot (RS1 to RSi) are set a registration information composed of a 6-octet MAC address (MAD) indicating a wireless terminal for requesting to register for a cell, a 1-octet reservation field (RSV), and a 1-octet CRC.

In these request slots, the base station receives a registration request from the wireless terminal just moved in the cell. In response, the base station determines whether or not the wireless terminal can be registered in the system by referring to the database (to be discussed below). If the base station accepts the registration request, the correspondent relation among the MAC address of the wireless terminal which has requested the registration, a local wireless terminal identifier (MSI: Mobile Station Identifier) added to the wireless terminal that is effective inside of the cell, and a number of a transmission request slot assigned to this wireless terminal is stored in database for assigning the management information. Then, the wireless terminal identifier (MSI) is registered in the filtering database for storing the identifiers of the wireless terminals currently located in the cell.

The transmission request slot is composed of an identifier of a terminal for requesting the registration, a request sequence number (RQN), a service type (STP), and a request fragment number (RFN), each of which has a length of one octet, a reservation field with a 2-octet length, an error fragment indication (EFI) with a 1-octet length, and a CRC with a 1-octet length.

As the identifier (MSI) of the requesting terminal is set a local wireless terminal identifier given to the wireless terminal by using a request reply field 32 (to be discussed below) when the terminal is registered in the cell. As the request sequence number (RQN) is set a sequence number of a module 256 that is increased at each request. Further, as the service type (STP) is set a fragment service type the wireless terminal tries to transmit if the transmission request is accepted.

The service type is composed of a code indicating a distinction of asynchronous data and synchronous data and a code indicating a distinction of broadcast communication and individual communication. If the transmitted data is asynchronous data, the number of requested fragments is specified in the request fragment number field.

Further, since the transmission request is issued, each wireless terminal needs at least one fragment. Hence, the value of FRN becomes "0" if the request fragment number is a minimum of "1".

In the error fragment indication (EFI), eight fragment slots contained in the fragment field 33 of an immediately previous frame correspond to the bits of one octet (8 bits), respectively and the error detected result of each fragment transmitted in the immediately previous frame is represented by a bit pattern (map) of "1" or "0".

A numeral 32 denotes a request reply field used for a registration request issued from a wireless terminal or transmission of a request reply issued from a base station in response to the transmission request. The request reply field is composed of a preamble with a 12-octet length, a field flag with a 4-octet length, 16 reply information slots each with a 10-octet length. The reply information slot is composed of i registration request reply information slots corresponding to the registration request slots RS1 to RSi and (16-i) transmission request reply information slots corresponding to the transmission request slots RSi+1 to RS16.

The reply information slot with a 10-octet length contains a MAC address with a 6-octet length, a request reply information (RRI), a terminal identifier (MSI), a request location identifier (RPI), and a CRC, each of the latter four having a 1-octet length.

As the request reply information (RRI), there are four types of informations; (a) "Grant of request", (b) "Refusal resulting from abnormal request information" (c) "Refusal resulting from any other except the abnormal request information" such as a communication band overflow, and (b) "Notice indicating that it is the accepted request".

The request location identifier (RPI) is used for assigning the transmission request slot to the wireless terminal for issuing a registration request. The identifier is composed of three-bit multiframe information and five-bit location information indicating a location of the transmission request slot.

In addition, the wireless terminal which detected a CRC abnormality determines that its own request is not accepted. Then, the terminal operates to transmit a request again by using the randomly selected registration request slot of a frame of the next frame or later.

The fragment field 33 is composed of eight fragment slots FF1 to FF8.

Each fragment slot is composed of a fragment slot control field (FSC) 33A used by a base station for transmitting control information and a fragment data field (FSD) 33B used by the wireless terminal specified by the FSC for transmitting the data. Each fragment slot is paired with a fragment reply field (FR) 34 used by a receiving terminal for transmitting reply information.

The receiving terminal operates to abandon the received data of the fragment slot if a CRC abnormality is detected in the fragment slot control field (to be discussed below) or a fragment slot data field.

The fragment slot control field (FSC) 33A contains a preamble with a 12-octet length, a field flag with a 4-octet length, and a fragment slot control information (FSCI) with a 10-octet length. The fragment slot control information (FSCI) contains an assignment address with a 6-octet length (ASAD; MAC address) for specifying a wireless terminal for transmitting data through the fragment data field (FSD) paired with the fragment slot control field (FSC), a fragment attribute (FGAT) with a 1-octet indicating a fragment type as indicated in FIG. 7, a request number (RSEQ) with a 1-octet length indicating a request sequence number (RQN), a fragment sequence number (FSEQ) with a 1-octet length indicating a sequence number (RSEQ) presumed for the next fragment transmitted on the fragment data field (FSD).

If the FSEQ has an initial value of "0", the maximum value of the FSEQ does not exceed the request fragment number RFN requested by the communication equipment (wireless terminal) when it transmits a transmission request. The ASAD serves as an address of the transmitted terminal.

The fragment data field (FSD) 33B contains a preamble with a 12-octet length, a field flag with a 4-octet length, and a fragment slot data information (FSDI) with a 268-octet length, for example.

Each wireless terminal given a transmission right at the just previous fragment slot control field FSC33A operates to transmit a destination address (DADD) with a 6-octet length, a fragment separation information (FSAR) with a 1-octet length, a fragment effective length with a 1-octet length, and a transfer information (fragment information; FI) composed of 256 octets on the field of the FSDI. The destination address indicates a MAC address of a destination terminal of this fragment slot. The fragment separation information indicates a separating location and a sequence number of this fragment. The fragment effective length indicates an effective length (number of octets) of the last fragment information.

The fragment reply field 34 is composed of a preamble with a 12-octet length, a field flag with a 4-octet length, and a reply pattern with a 2-octet length. By using this fragment reply field 34, the wireless terminal intended by the just previous fragment slot paired with the field 34 notifies the base station of the received result of this fragment slot.

A numeral 35 denotes a dummy field none of the base station and the wireless terminal uses for the transmission.

If the system is arranged to keep hopping synchronization among plural base stations, each communication frame contains a dummy field 35 having a predetermined length in each system (cell). That is, each system has the corresponding length of its dummy area 35.

As indicated by (A), (B) and (C) of FIG. 8, this system arrangement makes the locations of the frame control field 30 variable in the systems (cells 2A to 2C). This variety makes it possible to overcome unfavourable communication disability, because this disability is brought about by out of synchronization among the communication frames in the peripheral area of cells where plural communication frames are overlapped.

Figure 9:
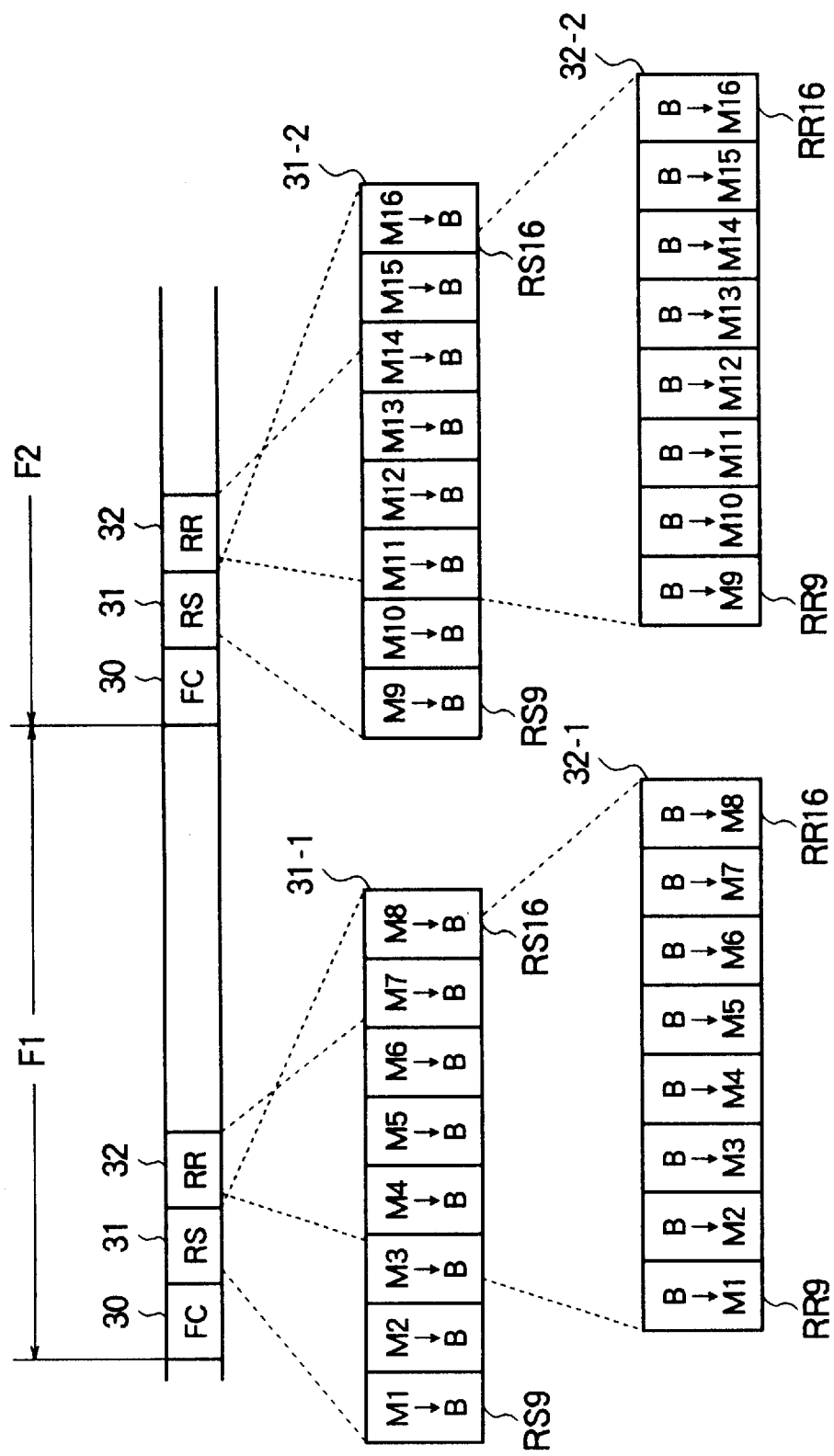
FIG. 9 is an explanatory view showing a multi-request field system according to another embodiment of the invention, the system arranged so that respective wireless terminals for communication frames share the same slot for requesting transmission.

FIG. 9 shows an embodiment of a multi-request field method used for increasing the number of wireless terminals to be registered in each base station.

The communication frame shown in FIG. 6 indicates that the number of the wireless terminals to be registered in each base station is restricted by the number of the transmission request slots to be prepared in the request field 31.

In a case that the communication frame format shown in FIG. 6 is adjusted to set the number i of the registration request slots as i=8, eight transmission request slots RS1 to RS16 are prepared in one communication frame, so that the base station can collect transmission requests from eight wireless terminals by one communication frame.

As shown in FIG. 9, in the request field (RS) 31-1 of the first frame F1 (odd frame), the transmission request slots RS1 to RS16 are assigned to the wireless terminals M1 to M8, respectively. In the request field 31-2 of the second frame F2 (even frame), the transmission request slots RS1 to RS16 are assigned to the other eight wireless terminals M9 to M16, respectively. In this arrangement, one base station has an allowance for 16 wireless terminals.

If the interval ("multi number") of the communication frame assigned to one wireless terminal is N, each cell enables to register N×8 wireless terminals. As such, as the multi number N is made greater, the number of the wireless terminals to be registered in one base station is made greater accordingly.

In the case of using the multi-request field method, the transmission request reply information slots RR9 to RR16 inside of the request reply field 31 are assigned to the wireless terminals M1 to M8 in the first frame and the wireless terminals M9 to M16 in the second frame. The transmission request reply information slot is assigned to each wireless terminal every one to some frames.

Each wireless terminal gets to know the arrangement of the multi-request field based on the content of the multi-frame identifier (MFI) received on the frame control field (FC) 30. Further, the wireless terminal gets to know the location of the transmission request slot RSj and the location of the transmission request reply information slot RRj assigned to itself from the request location identifier (RPI) reported by the base station when the terminal issues a registration request to the base station.

Figure 10:
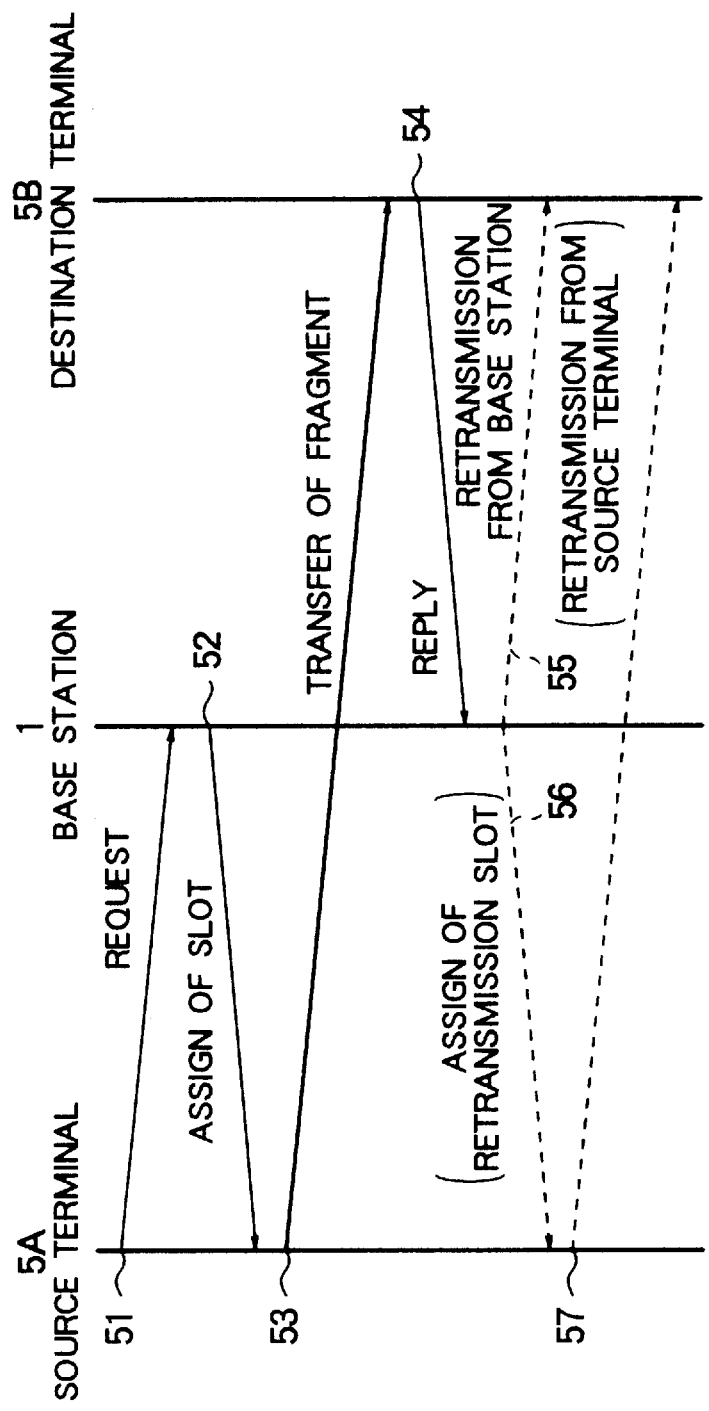
FIG. 10 is a view showing one example of a communication protocol executed in the wireless communication system according to the present invention.

FIG. 10 shows a protocol executed in the case of transmitting data from the wireless terminals 5A to 5B.

The wireless terminal 5A for transmitting data operates to issue a transmission request to the base station 1 through the use of the transmission request slot RSj assigned to the terminal itself (step 51).

In receipt of the transmission request, the base station 1 responds to the transmission request reply information slot RRj and specifies the wireless terminal 5A in any one of the fragment slot control field FSCk for assigning the slot to the terminal (step 52).

The wireless terminal 5A to which the slot is assigned in the field FSCk operates to transfer the fragment containing the transmitted data (step 53). A target wireless terminal 5B operates to transmit the information indicating whether or not the receipt of the fragment is successful through the fragment reply field FRk (step 54).

If the destination wireless terminal 5B fails to receive the fragment, the re-transmission of the fragment is basically executed by the base station 1 (step 55). However, if the base station 1 fails to receive the fragment, the base station operates to assign a new fragment slot for re-transmitting data to the wireless terminal 5A (step 56). Then, the wireless terminal 5A operates to transmit the same fragment again (step 57).

At the reply step 54, if the received data is individually communicated, the destination wireless terminal operates to reply to the data on its fragment reply field 34. If, however, the received data is broadcast, the destination wireless terminal operates to reply to the base station 1 on both the reply field 34 and the error fragment indication (EFI) of the request field 31. In addition, if the fragment information is broadcast, the wireless terminal uses a predetermined fragment slot field for replying.

Figure 11:
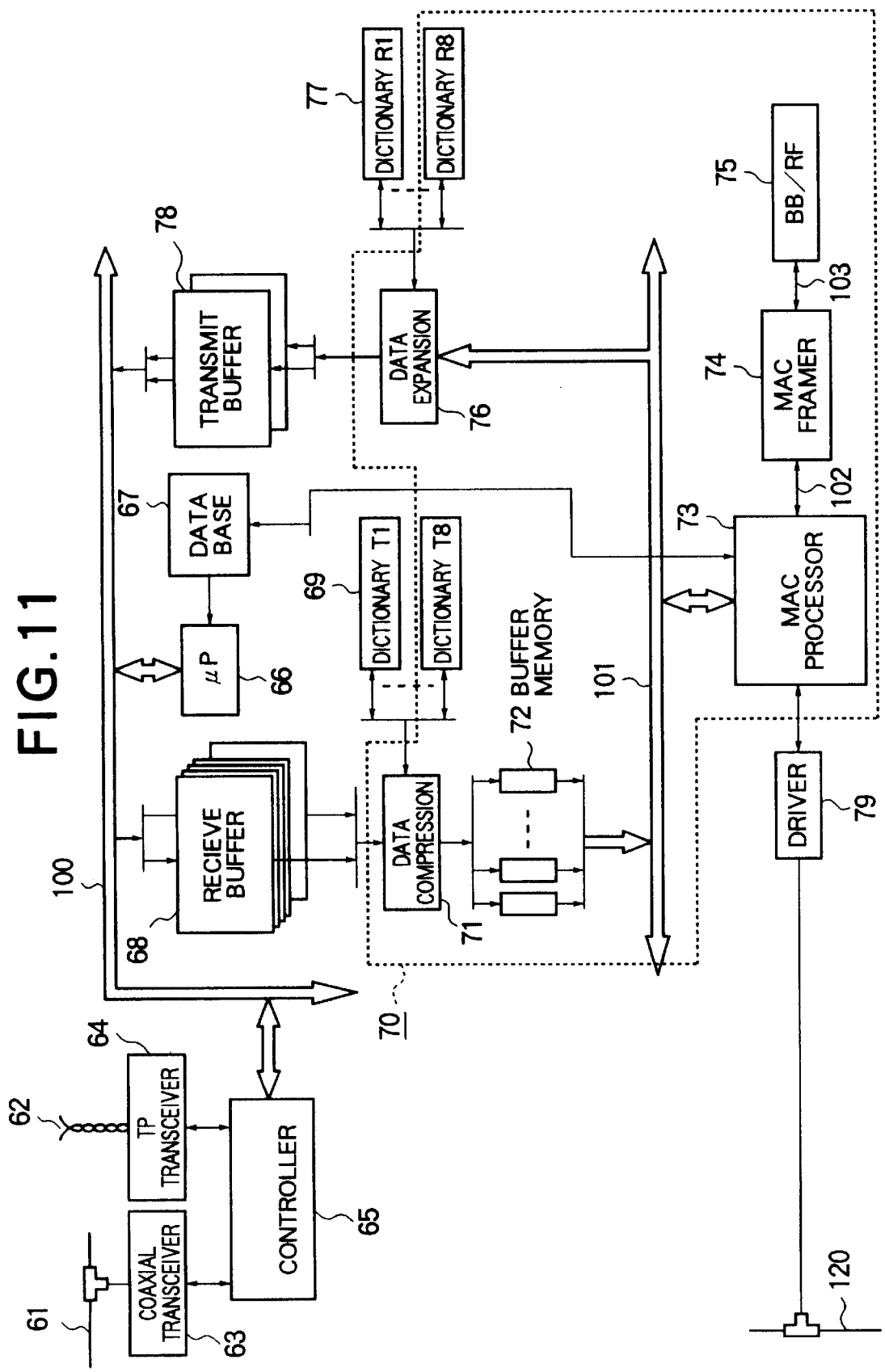
FIG. 11 is a block diagram showing an arrangement of a communication function block included in the base station.

FIG. 11 is a block diagram showing a communication unit included in the base station 1.

The communication unit of the wireless terminal 5 is composed of the same circuit as a block enclosed by a dotted line 70 in the base station.

The base station 1 provides "10 Base-2":61 and "10 Base-T":62 according to the IEEE 802.3 as backbone interfaces. The base station 1 processes a signal on a physical layer through the effect of a coaxial transceiver 63 and a TP transceiver 64 corresponding to the interfaces, respectively. For these transceivers, the DP8392 and DP83922 manufactured by the National Semiconductor, Ltd. may be used.

A numeral 65 denotes a controller for processing a MAC layer, which is connected to the coaxial transceiver 63 and the TP transceiver 64. For the controller, the DP83932B manufactured by the National Semiconductor, Ltd may be used. The packet information received from the backbone is transferred to the bus 100 through the effect of the controller 65. Under the control of a processor 66, the packet information is stored in a receive buffer 68 in which those packets are divided into those for the base station itself and those for the registered wireless terminals. This division is executed by referring to a database (table) 67 for storing the MAC addresses of the base station and the currently registered wireless terminals.

The packet information to be transmitted to the wireless terminal read from the receive buffer 68 is compressed by a data compression dictionary 69 in a data compression circuit 71. The data compression algorithm complies with V.42 bis, for example. Hence, the description about this algorithm is left out herein.

The compressed data is temporarily stored in a buffer 72 and then is read onto a bus 101 through the effect of a MAC processor 73. Next, the data is enciphered. The enciphered data is sequentially transmitted to the radio area through a MAC frame processing circuit 74 and a base band/wireless module 75.

For enciphering the compression data by the MAC processor 73, there may be applied a secret key cipher described in "Multi-Media Communication and Distributed Processing 40-5: "High Rate Encipherment for Multi-Media Communications"" published by the Information Processing Society.

In addition to the process for enciphering the compressed data, the MAC processor 73 further performs a process for dividing the enciphered packet information into plural fragments, a process for assembling the fragments received from a wireless terminal into packets, a process for generating a wireless frame as shown in FIG. 6, a control of communication procedure shown in FIG. 10, and a process for generating an inter-base-station control frame and sending or receiving the frame. In addition, the MAC processor 73 provides a table for determining a relation between a carrier frequency and a hopping sequence. Hence, the base station uses the different software for the MAC processor 73 from the wireless terminal.

The MAC frame processing circuit 74 performs a bit synchronization, a byte synchronization, and a frame synchronization with respect to the communication frames, checks a CRC inside of the frame and generates a CRC. Further, the base band/wireless module 75 operates to perform a modulating and a demodulating QPSK (Quadrature Phase Shift Keying) processes and send or receive a signal on the radio area.

In order to relay the enciphered data received from the path to the backbone, the MAC processor 73 operates to send the decoded packet data to a data expanding circuit 76. The data is expanded by using an expansion dictionary 77 and then is stored in a transmission buffer 78. The expanded data is read by the controller 65 and then is sequentially transmitted to the backbone 61 or 62.

A numeral 79 denotes a driver circuit provided between a leased line 120 connecting the base stations with each other and the MAC processor 73. The driver circuit 79 operates to send or receive a synchronous pulse for taking synchronization for frequency hopping between the base stations. The master base station sends the synchronous pulse and the slave base station(s) receives it.

In place of the leased line 120, the backbone 61 or 62 may be used for the purpose. In this case, the inter-base-station control packet for controlling synchronisation generated in the MAC processor 73 of the master base station is transmitted to the other slave base station through the backbone itself. Then, the hop timings are controlled to be synchronized with each other between the base stations.

Figure 12:
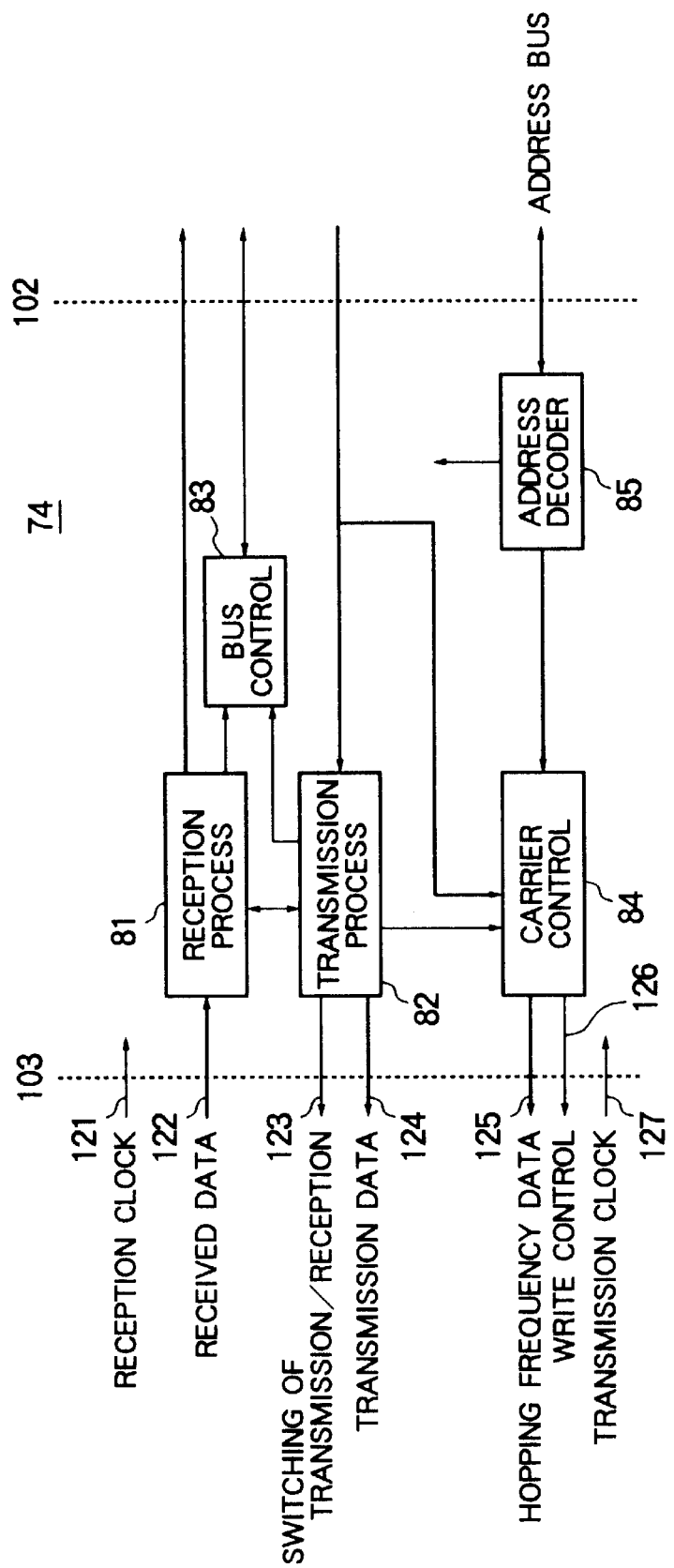
FIG. 12 is a block diagram showing a detail of a MAC frame processing circuit 74.

FIG. 12 is a block diagram showing the MAC frame processing circuit 74 in detail.

The MAC frame processing circuit 74 is connected to a MAC processor 73 through a bus 102 and to a base band/radio module 75 through a bus 103.

While a reception processing circuit 81 is receiving data from a radio area, a bus control circuit 83 generates a reception interrupt every four bytes when a frame flag or a field flag is received or a transmission timing when a transmission processing circuit 82 transmits data.

If the transmission processing circuit 82 serves as a component of a wireless terminal, the circuit 82 generates a reference frame based on a transmission clock of the relevant base station when the frame flag is received. Further, the circuit 82 operates to feed a transmission-to-reception switching signal 123 and transmitted data 124 to the base band/radio module 75 and output hopping frequency setting data 125 and a write control signal 126 on a predetermined timing.

If the transmission processing circuit 82 is applied to the base station, in particular, the slave base station arranged to take synchronization among the base stations, the circuit 82 operates to generate a reference frame based on the transmission clock 127 when it receives a synchronization notice from the master base station.

If the transmission processing circuit 82 is applied to the master base station or the slave base station arranged not to take synchronization among the base stations, the circuit 82 operates to generate a reference frame on any timing, based on the transmission clock 127.

The reception processing circuit 81 performs a bit synchronization, a byte synchronization, and a frame synchronization of a communication frame and checks a CRC inside of the frame with respect to the received data 122 from the base band/radio module 75. Then, the circuit 81 operates to change the data processing timing from the receiving clock 121 to the transmission clock 127.

Figure 13:
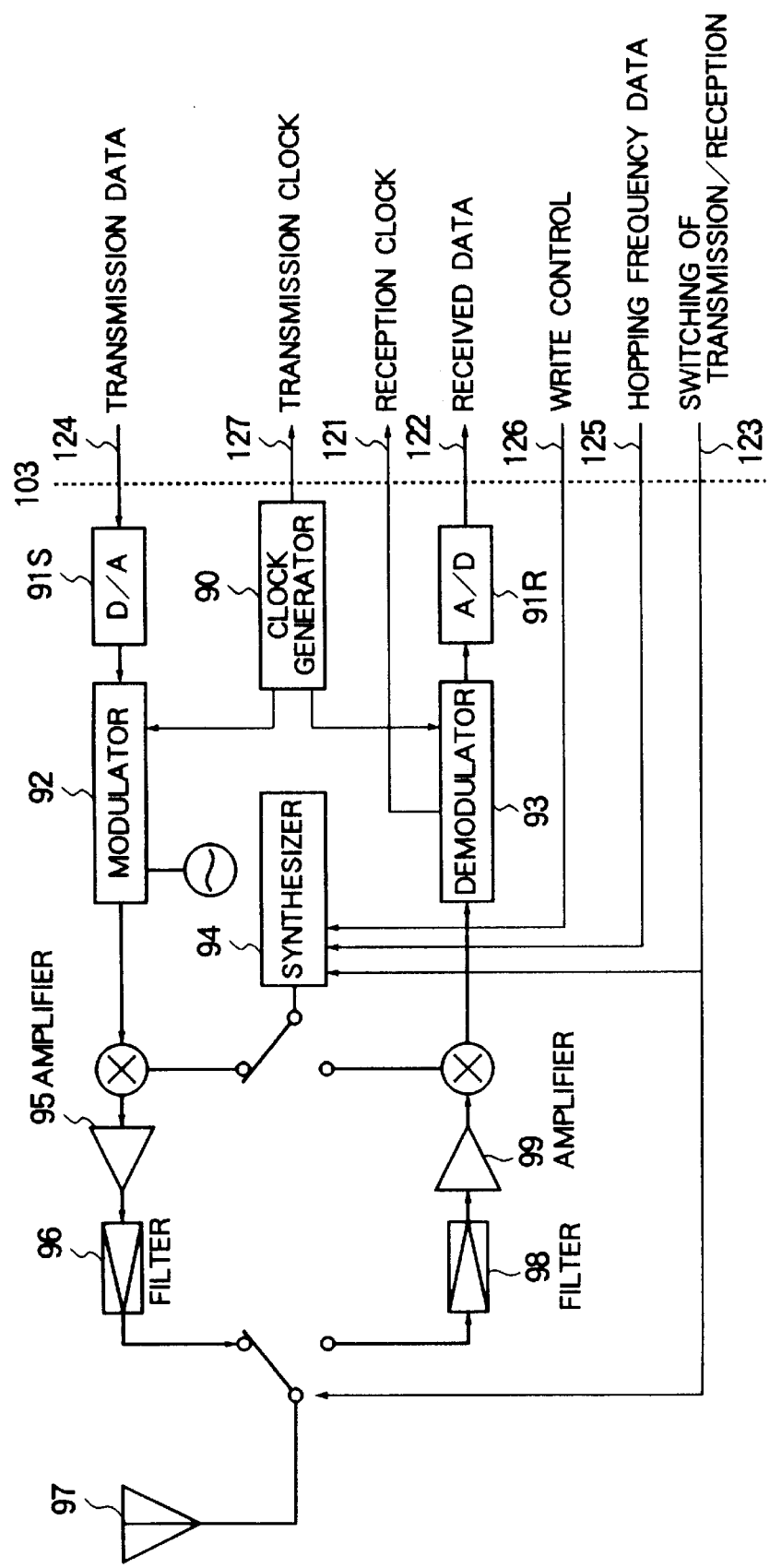
FIG. 13 is a block diagram showing a detail of a base band/wireless module 75.

FIG. 13 is a block diagram showing the base band/radio module 75 in detail.

A numeral 91S denotes a digital-to-analog converter for converting the transmitted data fed from the MAC frame processing circuit 74 to an analog signal. A numeral 92 denotes a modulator for doing a QPSK modulation about the analog signal based on the basic clock generated in a clock generator 90. A numeral 94 denotes a synthesizer for switching a carrier frequency based on the hopping frequency data 125 given from the MAC frame processing circuit 74. The output of the modulator 92 is overlapped with the carrier frequency of the synthesizer 94 and then is amplified by a transmission amplifier 95. The amplified signal is sent out to an antenna 97 through a filter 96.

The received signal from the antenna 97 is applied to the receiving amplifier 99 through the filter 98. The signal component overlapped with the carrier frequency of the synthesizer 94 is QPSK-demodulated by a demodulator 93. The signal is sent to an analog-to-digital converter 91R in which it is converted into a digital signal. The digital signal is applied as the received data to the MAC frame processing circuit 74.

As is obvious from the aforementioned description, the system according to the present invention is arranged so that each slave base station can hop a frequency on a hop timing specified by a master base station. Hence, if the number of cells is within the number of hops, the collision probability of carrier frequencies is made zero. This enables to prevent the communication efficiency from being degraded if a cell is formed in the state of overlapping the adjacent cells with each other.

Further, the system is arranged so that each wireless terminal pre-stores in table means carrier frequencies used for the hopping sequence and their hopping sequence in a manner to correspond to the hopping sequence identifiers. Each carrier frequency hopping is controlled according to the hopping sequence identifier specified by the base station. If the transmission error disallows the hopping information to be properly received over several frames, each wireless terminal serves to hop a proper carrier frequency.

Moreover, the registration request slot in each wireless frame is arranged to wait for a new registration request arbitrarily transmitted by any wireless terminal. The transmission request slot is arranged to predetermine the wireless terminal having a transmission right for each slot. The same slot is shared by wireless terminals for the corresponding frames. Hence, the number of the wireless terminals to be registered in each cell is allowed to be increased.

What is claimed is:

1. A wireless communication system comprising:

a master base station and a plurality of slave base stations, each of said master and slave base stations forming a cell and communicating with wireless terminals located within the cell in a predetermined communication sequence according to a frame format of a wireless communication frame generated thereby as hopping a carrier frequency of the wireless communication frame synchronously with said wireless terminals in a predetermined hopping sequence, wherein said master base station includes means for providing a hop timing of said carrier frequency to said slave base stations, and each of said slave base stations having means for hopping said carrier frequency in response to said hop timing provided by said master base station, and wherein said master base station and said slave base stations are connected through a first path for communicating data between said cells and through a second path for communicating control information among said master and slave base stations, and said hop timing is informed through said second path.

2. A wireless communication system comprising:

a master base station and a plurality of slave base stations, each of said master and slave base stations forming a cell and communicating with wireless terminals located within the cell in a predetermined communication sequence according to a frame format of a wireless communication frame generated thereby as hopping a carrier frequency of the wireless communication frame synchronously with said wireless terminals in a predetermined hopping sequence, wherein said master base station includes means for providing a hop timing of said carrier frequency to said slave base stations, and each of said slave base stations having means for hopping said carrier frequency in response to said hop timing provided by said master base station, and wherein each of said slave base stations includes means for determining an individual switching timing based on said hop timing informed by said master base station, so that said master and slave base stations hop said carrier frequencies with a predetermined phase difference with respect to each other.

3. A wireless communication system comprising:

a master base station and a plurality of slave base stations, each of said master and slave base stations forming a cell and communicating with wireless terminals located within the cell in a predetermined communication sequence according to a frame format of a wireless communication frame generated thereby as hopping a carrier frequency of the wireless communication frame synchronously with said wireless terminals in a predetermined hopping sequence, wherein said master base station includes means for providing a hop timing of said carrier frequency to said slave base stations, and each of said slave base stations having means for hopping said carrier frequency in response to said hop timing provided by said master base station, and wherein each of said master and slave base stations includes means for transmitting identification information for specifying a frequency hopping sequence to said wireless terminals through said wireless communication frame, and each of said wireless terminals includes means for hopping individual carrier frequencies in a sequence specified in accordance with said identification information at a wireless communication frame period.

4. A wireless communication system comprising:

a master base station and a plurality of slave base stations, each of said master and slave base stations forming a cell and communicating with wireless terminals located within the cell in a predetermined communication sequence according to a frame format of a wireless communication frame generated thereby as hopping a carrier frequency of the wireless communication frame synchronously with said wireless terminals in a predetermined hopping sequence, wherein said master base station includes means for providing a hop timing of said carrier frequency to said slave base stations, and each of said slave base stations having means for hopping said carrier frequency in response to said hop timing provided by said master base station, wherein each of said slave base stations includes means for determining an individual switching timing based on said hop timing informed by said master base station, so that said master and slave base stations hop said carrier frequencies with a predetermined phase difference with respect to each other, and wherein each of said slave base stations includes means for generating said wireless communication frame on said individual switching timing in synchronization with the hopping of said carrier frequency.

5. A wireless communication system comprising a master base station and a plurality of slave base stations, each of said master and slave base stations forming a cell and communicating with wireless terminals located within the cell as hopping a carrier frequency of a wireless communication frame synchronously with said wireless terminal in a predetermined hopping sequence, wherein:

each of said master and slave base stations comprises;

means for generating wireless communication frames periodically, each of which defines a control field for use in transmission of control information and a plurality of fragment fields for use in transmission of data by wireless terminals given a transmission right, said control field being divided into a group of first request slots for use in transmission of first request information for indicating a registration request from a wireless terminal newly associated with the cell formed by the base station and a group of second request slots for use in transmission of a second request information for indicating a request of said transmission right from said wireless terminals located in said cell; and means for assigning said fragment fields of each of said wireless communication frames to a plurality of wireless terminals which requested said transmission right through said second request slots of the wireless communication frame.

6. A wireless communication system as claimed in claim 5, wherein:

said master base station includes means for informing a hop timing of the carrier frequency to said slave base stations, and each of said slave base stations generates said respective wireless communication frames and switches the carrier frequency thereof, in response to said hop timing.

7. A wireless communication system as claimed in claim 5, wherein:

each of said master and slave base stations includes means for informing identification information of a frequency hopping sequence to said wireless terminals located in the cell through the control field of each of said wireless communication frames, and each of said wireless terminals includes means for storing a plurality of frequency hopping sequence and means for determining a carrier frequency to be used in communication through a next incoming wireless communication frame, among a group of carrier frequencies belonging to a specific one of said hopping sequences which is specified in accordance with said identification information.

8. A wireless communication system as claimed in claim 6, wherein each of said wireless terminals includes:

means for transmitting said first request information for a registration request at an arbitrary timing of one of said first request slots in one of said wireless communication frames; and means for transmitting said second request information for getting said transmission right at a timing of a specific one of said second request slots in one of said communication frames when data to be transmitted has been prepared, said specific one of said second request slots having been assigned by one of said master and slave base station in response to said registration request.

9. A wireless communication system as claimed in claim 8, wherein each of said wireless terminals includes:

means for using said specified one of said second request slots in a time-divisional manner together with at least one of the other wireless terminals at least every other communication frame.

10. A wireless communication system as claimed in claim 5, wherein:

each of said wireless communication frames includes a reply field divided into a plurality of reply slots corresponding to said first and second request slots, respectively, each of said master and slave base stations including means for transmitting, at a timing of specified one of said reply slots of the wireless communication frames, a terminal identifier assigned to one of the wireless terminals if the wireless terminal has issued said registration request at one of said first request slots of the wireless communication frame, each wireless terminal having means for transmitting said second request information, which includes said terminal identifier at a timing of said specific one of said second request slots, each of said master and slave base stations operating to designate one of said wireless terminals by transmitting said terminal identifier at a timing of a first portion of one of said fragment fields of the wireless communication frame when the base station has received said second request information, and the wireless terminal designated by the terminal identifier transmits data at a timing of a second portion of said fragment field.

11. A wireless communication system as claimed in claim 10, wherein each of said wireless communication frames includes a plurality of fragment reply fields each located after the second portion of said each fragment field, and each of said wireless terminals includes means for transmitting a reception reply at a timing of specified one of said fragment reply fields following one of said fragment fields if data destined for the wireless terminal has received from the second portion of the fragment field.

12. A wireless communication system as claimed in claim 11, wherein each of said master and slave base stations includes:

storage means for temporarily storing the data received from said fragment fields of each of said wireless communication frames, and means for retransmitting the data read out from said storage means at a timing of one of the other fragment fields of one of said wireless communication frames if no reception reply is issued as to the data after the base station has received the data from said second portion of one of said fragment fields of the wireless communication frame.

13. A wireless terminal for communicating with a piece of communication equipment through a base station in a predetermined sequence according to a frame format of a wireless communication frame generated by said base station while hopping a carrier frequency of the wireless communication frame synchronously with said base station, comprising:

memory means for storing information defining carrier frequencies grouped into a plurality of hopping sequences, each of which corresponds to a hopping sequence identifier;

means for selecting a next carrier frequency, to be hopped from a current carrier frequency used in a current wireless communication frame, from among a group of carrier frequencies in a specific hopping sequence read out from said memory means according to a hopping sequence identifier which has been received at a control information field of each of said wireless communication frames; and means for switching the current carrier frequency to said next carrier frequency at a predetermined timing determined depending upon a length of the wireless communication frame, periodically.

14. A wireless terminal for communicating with another communication equipment through a base station in a predetermined sequence according to a frame format of wireless communication frames generated by said base station, comprising:

memory mean for storing information defining carrier frequencies grouped into a plurality of hopping sequences each of which is related a hopping sequence identifier;

means for selecting a next carrier frequency to be hopped from a current carrier frequency used in a current wireless communication frame, among a group of carrier frequencies in a specific hopping sequence read out from said memory means in accordance with a hopping sequence identifier which has received at a control information field of each of said wireless communication frames;

means for switching the current carrier frequency to said next carrier frequency at a predetermined timing determined depending upon a length of the wireless communication frame;

means for issuing a registering request at an arbitrary timing within a predetermined number of first request slots defined at a predetermined location of one of said wireless communication frames;

means for issuing a data transmission request at a specified timing corresponding to specific one of a plurality of second request slots defined at a predetermined location of subsequent one of said wireless communication frames, said specific one of second request slots having been assigned to the wireless terminal by said base station in response to said registration request; and means for transmitting data at a timing of a specific fragment slot of said subsequent one of sid wireless communication frames, said specific fragment slot having been designated by said base station in response to said data transmission request among a plurality of fragment slots defined at a predetermined location of the wireless communication frame.

15. A wireless terminal for communication with another communication equipment through a base station in a predetermined sequence according to a frame format of wireless communication frames generated by said base station, comprising:

memory means for storing information defining carrier frequency grouped into a plurality of hopping sequences each of which is related a hopping sequence identifier;

means for selecting a next carrier frequency to be hopped from a current carrier frequency used in a current wireless communication frame, among a group of carrier frequencies in a specific hopping sequence read out from said memory means in accordance with a hopping sequence identifier which has received at a control information field of each of said wireless communication frames;

means for switching the current carrier frequency to said next carrier frequency at a predetermined timing determined depending upon a length of the wireless communication frame;

means for communicating with said base stations to get a transmission right for at least one of data slots defined in each of said wireless communication frames;

means for compressing data to be transmitted;

means for enciphering the data compressed by said compressing means;

means for converting the data enciphered by said enciphering means into a plurality of data packets each having a predetermined length; and means for transmitting one of said data packets at a timing of a specified data slot for which the transmission right has been obtained.

\* \* \* \* \*